US011753580B2

(12) United States Patent
Jackson et al.

(10) Patent No.: US 11,753,580 B2
(45) Date of Patent: Sep. 12, 2023

(54) INVERSE EMULSION COMPOSITIONS

(71) Applicant: Kemira OYJ, Helsinki (FI)

(72) Inventors: Logan Jackson, Norcross, GA (US); Thomas J. Lynch, Roswell, GA (US); Ronald Robinson, Newnan, GA (US); Frances Fournier, Woodstock, GA (US); Hong Yang, Newark, DE (US); Sukhjit Aujla, The Woodlands, TX (US); Do Hoon Kim, Katy, TX (US); Dennis Arun Alexis, Richmond, TX (US)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 16/386,602

(22) Filed: Apr. 17, 2019

(65) Prior Publication Data

US 2019/0241793 A1 Aug. 8, 2019

Related U.S. Application Data

(63) Continuation of application No. 15/781,811, filed as application No. PCT/US2016/065394 on Dec. 7, 2016, now abandoned.

(60) Provisional application No. 62/264,700, filed on Dec. 8, 2015.

(51) Int. Cl.
| | |
|---|---|
| C09K 8/36 | (2006.01) |
| C09K 8/584 | (2006.01) |
| C08F 20/56 | (2006.01) |
| C08F 220/56 | (2006.01) |
| C09K 8/588 | (2006.01) |
| C09K 8/92 | (2006.01) |

(52) U.S. Cl.
CPC .............. *C09K 8/584* (2013.01); *C08F 20/56* (2013.01); *C08F 220/56* (2013.01); *C09K 8/36* (2013.01); *C09K 8/588* (2013.01); C09K 8/92 (2013.01)

(58) Field of Classification Search
CPC ............ C09K 2208/26; C09K 2208/32; C09K 8/588; C09K 8/805; C09K 2200/0682; C09K 2208/08; C09K 2208/10; C09K 3/10; C09K 3/1409; C09K 3/1436; C09K 5/14; C09K 8/03; C09K 8/032; C09K 8/42; C09K 8/50; C09K 8/52; C09K 8/54; C09K 8/5756; C09K 8/58; C09K 8/60; C09K 8/602; C09K 8/62; C09K 8/665; C09K 8/68; C09K 8/72; C09K 8/74; C09K 8/86; E21B 43/26; E21B 41/0085; E21B 43/267; E21B 47/00; E21B 47/06; E21B 47/065; E21B 47/1015; E21B 47/12; E21B 47/122; E21B 47/124
See application file for complete search history.

(56) References Cited

U.S. PATENT DOCUMENTS

| | | | |
|---|---|---|---|
| 3,624,019 A | 11/1971 | Anderson et al. | |
| 3,734,873 A * | 5/1973 | Anderson et al. .... | C02F 1/5227 523/336 |
| 3,852,234 A | 12/1974 | Venema | |
| 3,893,510 A | 7/1975 | Elphingstone et al. | |
| 4,034,809 A * | 7/1977 | Phillips .................. | C09K 8/588 166/270.1 |
| 4,052,353 A * | 10/1977 | Scanley ................... | C08F 8/00 524/801 |
| 4,115,340 A | 9/1978 | Ellwanger | |
| 4,331,787 A | 5/1982 | Fairchok et al. | |
| 4,439,332 A * | 3/1984 | Frank ...................... | C09K 8/58 166/275 |
| 4,473,689 A | 9/1984 | Login et al. | |
| 4,505,828 A | 3/1985 | Lipowski et al. | |
| 4,528,321 A | 7/1985 | Allen et al. | |
| 4,622,356 A | 11/1986 | Jarovitzky et al. | |
| 5,067,508 A | 11/1991 | Lee et al. | |
| 5,190,374 A | 3/1993 | Harms et al. | |
| 5,470,150 A | 11/1995 | Pardikes | |
| 6,217,828 B1 | 4/2001 | Bretscher et al. | |
| 6,365,656 B1 | 4/2002 | Green et al. | |
| 6,392,596 B1 | 5/2002 | Lin et al. | |
| 6,485,651 B1 | 11/2002 | Banning | |
| 6,833,406 B1 | 12/2004 | Green et al. | |
| 7,186,673 B2 | 3/2007 | Varadaraj et al. | |
| 7,595,284 B2 | 9/2009 | Crews | |
| 7,770,641 B2 | 8/2010 | Dwarakanath et al. | |

(Continued)

FOREIGN PATENT DOCUMENTS

| | | |
|---|---|---|
| CA | 832277 | 1/1970 |
| CA | 255464 | 6/2005 |

(Continued)

OTHER PUBLICATIONS

D.V. Levitt, Dissertation: "The Optimal Use of Enhanced Oil Recovery Polymers Under Hostile Conditions", Year 2009.*
Liu, Z, et al, Experimental Evaluation of Surfactant Application to Improve Oil Recovery, 2011.*
https://www.collinsdictionary.com/dictionary/english/filter downloaded on May 28, 2021.*
SNF SAS document, 2012.*

(Continued)

*Primary Examiner* — Kumar R Bhushan
(74) *Attorney, Agent, or Firm* — Eversheds Sutherland (US) LLP

(57) ABSTRACT

An inverse emulsion composition comprising: one or more hydrophobic liquids having a boiling point at least about 100° C.; up to about 38% by weight of one or more acrylamide-(co)polymers; one or more emulsifier surfactants; and one or more inverting surfactants; wherein, when the composition is inverted in an aqueous solution, it provides an inverted solution having a filter ratio using a 1.2 micron filter (FR1.2) of about 1.5 or less.

13 Claims, No Drawings

(56) References Cited

U.S. PATENT DOCUMENTS

| | | | |
|---|---|---|---|
| 7,939,472 | B2 | 5/2011 | Crews |
| 8,357,724 | B2 * | 1/2013 | Deroo ................. C08F 2/32 |
| | | | 516/21 |
| 8,360,152 | B2 | 1/2013 | DeFosse et al. |
| 8,383,560 | B2 | 2/2013 | Pich et al. |
| 8,841,240 | B2 | 9/2014 | Kakdjian et al. |
| 8,865,632 | B1 | 10/2014 | Parnell et al. |
| 8,946,132 | B2 | 2/2015 | Chang et al. |
| 8,973,668 | B2 * | 3/2015 | Sanders ............ C08G 65/2609 |
| | | | 166/402 |
| 9,580,639 | B2 | 2/2017 | Chang et al. |
| 9,988,571 | B2 | 6/2018 | Salazar et al. |
| 2005/0239957 | A1 | 10/2005 | Pillsbury et al. |
| 2007/0012447 | A1 | 1/2007 | Fang et al. |
| 2008/0045422 | A1 | 2/2008 | Hanes et al. |
| 2008/0217013 | A1 | 9/2008 | Stokes et al. |
| 2011/0118153 | A1 * | 5/2011 | Pich ..................... B01F 1/0005 |
| | | | 507/225 |
| 2011/0140292 | A1 | 6/2011 | Chang et al. |
| 2011/0151517 | A1 | 6/2011 | Therre et al. |
| 2012/0071316 | A1 * | 3/2012 | Voss ..................... B01D 61/027 |
| | | | 502/21 |
| 2013/0005616 | A1 | 1/2013 | Gaillard et al. |
| 2013/0197108 | A1 | 8/2013 | Koczo et al. |
| 2014/0024731 | A1 | 1/2014 | Blanc et al. |
| 2014/0221549 | A1 | 8/2014 | Webster et al. |
| 2014/0287967 | A1 * | 9/2014 | Favero ..................... C09K 8/12 |
| | | | 507/120 |
| 2014/0326457 | A1 | 11/2014 | Favero |
| 2015/0148269 | A1 | 5/2015 | Tamsilian et al. |
| 2015/0197439 | A1 | 7/2015 | Zou et al. |
| 2015/0376998 | A1 | 12/2015 | Dean et al. |
| 2016/0032170 | A1 * | 2/2016 | Li ............................ C09K 8/588 |
| | | | 166/305.1 |
| 2016/0122622 | A1 | 5/2016 | Dwarakanath et al. |
| 2016/0122623 | A1 | 5/2016 | Dwarakanath et al. |
| 2016/0122624 | A1 | 5/2016 | Dwarakanath et al. |
| 2016/0122626 | A1 | 5/2016 | Dwarakanath et al. |
| 2016/0289526 | A1 | 10/2016 | Alwattari et al. |
| 2017/0037299 | A1 | 2/2017 | Li et al. |
| 2017/0121588 | A1 | 5/2017 | Chang et al. |
| 2017/0158947 | A1 | 6/2017 | Kim et al. |
| 2017/0158948 | A1 | 6/2017 | Kim et al. |
| 2017/0321111 | A1 | 11/2017 | Velez et al. |
| 2018/0155505 | A1 | 6/2018 | Kim et al. |
| 2018/0362833 | A1 | 12/2018 | Jackson et al. |
| 2019/0002754 | A1 | 1/2019 | Yang et al. |

FOREIGN PATENT DOCUMENTS

| | | |
|---|---|---|
| CA | 2545464 | 6/2005 |
| CA | 2950810 | 6/2017 |
| DE | 2419764 | 12/1975 |
| EP | 2283915 | 2/2011 |
| GB | 1384470 | 2/1975 |
| WO | 2009053029 | 4/2009 |
| WO | 2011113470 | 9/2011 |
| WO | 2012069438 | 5/2012 |
| WO | 2012069477 | 5/2012 |
| WO | 2012136613 | 10/2012 |
| WO | 2012170373 | 12/2012 |
| WO | WO 2012/170373 | 12/2012 |
| WO | 2013108173 | 7/2013 |
| WO | 2014075964 | 5/2014 |
| WO | 2016030341 | 3/2016 |
| WO | 2017100327 | 6/2017 |
| WO | 2017100329 | 6/2017 |
| WO | 2017100331 | 6/2017 |
| WO | 2017100344 | 6/2017 |
| WO | 2017121669 | 7/2017 |
| WO | 2017177476 | 10/2017 |
| WO | 2018045282 | 3/2018 |
| WO | 2018106913 | 6/2018 |
| WO | 2019006305 | 1/2019 |
| WO | 2019006307 | 1/2019 |
| WO | 2019006369 | 1/2019 |

OTHER PUBLICATIONS

Jordi (Mw Averages Explanations, downloaded on Feb. 2, 2022).*

Levitt, DB. The Optimal Use of Enhanced Oil Recovery Polymers under Hostile Conditions. Disserta-tion Presented to the Faculty of the Graduate School of the University of Texas at Austin in Partial Ful-fillment of the Requirements for the Degree of Doctor of Philosophy, 2009, pp. 1-195; p. 7.

International Search Report and Written Opinion issued in Application No. PCT/US16/65421, dated Feb. 16, 2017.

International Preliminary Report on Patentability issued in Application No. PCT/US16/65421, dated Jun. 21, 2018.

Koh, Experimental Investigation of the Effect of Polymers on Residual Oil Saturation, Ph. D Dissertation, University of Texas at Austin, 2015.

Liu, Experimental Evaluation of Surfactant Application to Improve Oil Recovery, Liu Experimental Evaluation of Surfactant Application to Improve Oil Recovery, Dissertation, Univ of Kansas, 2011 [Retrieved from the Internet on Jan. 16, 2016] kuscholarworks.ke.eduhandle/1808/8378; abstract; table 5.1; p. 40, para. 4; p. 46, para. 2, 2011, abstract; table 5.1; p. 40, para. 4; p. 46, para. 2.

Magbagbeola, O. A., Quantification of the Viscoelastic Behavior of High Molecular Weight Polymers used for Chemical Enhanced Oil Recovery, M. S. Thesis, University of Texas at Austin, 2008.

Petroleum, Enhanced Oil Recovery, Kirk-Othmer, Encyclopedia of Chemical Technology, 2005, John Wiley and Sons, vol. 18, p. 1-29.

Dwarakanath et al., Permeability reduction due to use of liquid polymers and development of remediation options, SPE 179657, Society of Petroleum Engineers, SPE Improved Oil Recovery Conference, Apr. 11-13, Tulsa, Oklahoma, USA, 2016.

Hibbert, et al., Effect of mixing energy levels during batch mixing of cement slurries, SPE 25147-PA, Society of Petroleum Engineers, SPE Drilling & Completion, Mar. 1995, 10(01), 49-52.

Orban, et al., Specific mixing energy: A key fact for cement slurry quality, SPE-15578, Society of Petroleum Engineers, SPE Annual Technical Conference and Exhibition, Oct. 5-8, New Orleans, Louisiana, USA 1986.

Extended European Search Report dated May 7, 2019 in related EP Application 16873783.1.

International Search Report and Written Opinion dated Sep. 20, 2018 in International Application PCT/US2018/040401.

International Search Report and Written Opinion dated Sep. 20, 2018 in International Application PCT/US2018/040300.

International Search Report and Written Opinion dated Sep. 21, 2018 in International Application PCT/US2018/040302.

International Search Report and Written Opinion dated Feb. 13, 2018 in International Application PCT/US2017/065106.

International Search Report from PCT/US2016/065397, dated Apr. 4, 2017.

International Search Report from PCT/US2016/065394, dated Feb. 6, 2017.

Levitt, The Optimal Use of Enhanced Oil Recovery Polymers under Hostile Conditions, Dissertation Presented to the Faculty of the Graduate School of the University of Texas at Austin in Partial Fulfillment of the Requirements for the Degree of Doctor of Philosophy, 2009, pp. 1-195; p. 7.

International Search Report from PCT/US2016/065391, dated Feb. 21, 2017.

Croda. HYPERMER 2296-LQ-(MV), Jun. 15, 2015 (Retrieved on Jan. 17, 2017), Retrieved from the Internet: <URL: https://msds.crodadirect.com/>; p. 2.

Search Report issued by the Brazilian Patent Office for application 112018011684-0, dated Feb. 27, 2020.

* cited by examiner

INVERSE EMULSION COMPOSITIONS

CROSS-REFERENCE TO RELATED APPLICATION

The application is a continuation application of and claims priority to U.S. application Ser. No. 15/781,811, entitled "INVERSE EMULSION COMPOSITIONS," filed Jun. 6, 2018, which application is the 35 U.S.C. § 371 National Stage application of PCT Application No. PCT/US2016/065394, filed Dec. 7, 2016, which application claims priority to U.S. Provisional Application No. 62/264,700, filed Dec. 8, 2015, the entirety of which applications are incorporated herein by reference.

BACKGROUND

Polymer flooding is a technique used in enhanced oil recovery (EOR). It involves injecting an aqueous solution of a water-soluble thickening polymer (e.g., high molecular weight polyacrylamide) into a mineral oil deposit. As a result, it is possible to mobilize additional mineral oil in the formation. Details of polymer flooding and of polymers suitable for this purpose are disclosed, for example, in "Petroleum, Enhanced Oil Recovery," Kirk-Othmer, Encyclopedia of Chemical Technology, online edition, John Wiley and Sons, 2010.

The aqueous polymer solution used in polymer flooding typically has a active polymer concentration of from about 0.05 weight percent to about 0.5 weight percent. Additional components may be added to the aqueous polymer solution, such as surfactants or biocides.

Large volumes of the aqueous polymer solution are necessary for polymer flooding and the process may go on for months or even years. Given the volumes required, conventional polymer flooding involves dissolving the polymer (in the form of a dry powder) on site using fresh water, brine, sea water, production water, and/or formation waste. Unfortunately, the conventional dissolution process is time-consuming and there are few ways to decrease the time without damaging the polymer. The space required for on-site dissolution of dry powder polymers is also significant. While space is normally not a limiting factor in land-based oil production, space is limited in off-shore oil production. Whether land-based or off-shore, the necessary equipment for conventional, dry powder-based on site preparation of polymer flooding solutions is expensive.

Inverse emulsions (water-in-oil) offer an alternative to on-site dissolution of dry powders, particularly for off-shore oil production. The active polymer concentration in inverse emulsions is typically about 30 weight percent. For use, the inverse emulsion is diluted with water to provide the desired final concentration of the polymer. European Patent Publication No. 2283915 A1 discloses a method of continuous dissolution of polyacrylamide emulsions for EOR.

The description herein of certain advantages and disadvantages of known methods and devices is not intended to limit the scope of the present invention. Indeed the present embodiments may include some or all of the features described above without suffering from the same disadvantages.

SUMMARY

In view of the foregoing, one or more embodiments include: an inverse emulsion composition comprising one or more hydrophobic liquids having a boiling point at least about 100° C.; up to about 38% by weight of one or more acrylamide-(co)polymers; one or more emulsifier surfactants; and one or more inverting surfactants; wherein, when the composition is inverted in an aqueous solution, it provides an inverted polymer solution having a filter ratio using a 1.2 micron filter (FR1.2) of about 1.5 or less.

DETAILED DESCRIPTION

Generally, the various exemplary embodiments described herein provide an inverse emulsion composition comprising an acrylamide (co)polymer, as well as an inverted polymer solution derived therefrom. The various exemplary embodiments described herein also provide methods for preparing the inverse emulsion compositions. The exemplary inverse emulsion compositions provide improved performance in EOR applications. The inverse emulsion composition is described in more detail herein, as are its performance characteristics, typically with reference to the inverted polymer solution derived therefrom.

In EOR applications, the inversion of a conventional inverse emulsion composition is generally difficult. The requirements of the end-users are often very strict: total dissolution in less than 5 minutes, completely and continuously. In exemplary embodiments, an inverse emulsion composition dissolves in an aqueous solution to a final concentration of about 50 to about 15,000 ppm, or about 500 to about 5000 ppm in less than about 30 minutes, or less than about 20 minutes, or less than about 10 minutes, or less than about 5 minutes.

An inverted polymer solution prepared from the exemplary inverse emulsion compositions provides improved performance. An exemplary inverted polymer solution flows through a formation without plugging the pores of the formation. Plugging the formation can slow or inhibit oil production. This is especially concerning where formation permeability is low to start with.

Definitions

As used herein, "up to" means that there is at least some of the component referenced.

As used herein, "enhanced oil recovery" (abbreviated "EOR") refers to various techniques for increasing the amount of crude oil that can be extracted from an oil field that conventional techniques do not recover.

As used herein, "filter ratio" (abbreviated "FR") or "filter quotient" are used interchangeably herein to refer to a test used to determine performance of the inverse emulsion composition (or the inverted polymer solution derived therefrom) in conditions of low formation permeability consisting of measuring the time taken by given volumes/concentrations of solution to flow through a filter. The FR generally compares the filterability of the polymer solution for two equivalent consecutive volumes, which indicates the tendency of the solution to plug the filter. Lower FRs indicate better performance.

Two filter ratio test methods are referenced herein. The first method, referred to as "FR5" or "filter ratio using a 5 micron filter," involves passing a 500 mL sample of a polymer solution through a 47 mm diameter polycarbonate filter having 5 micron pores, under 1 bar pressure (+/−10%) of $N_2$ or argon at ambient temperature (e.g., 25° C.). The times required to obtain 100 g, 200 g, 400 g, and 500 g of filtrate are recorded, and the FR5 filter ratio is calculated as $$\frac{\text{time at 500 g} - \text{time at 400 g}}{\text{time at 80 g} - \text{time at 60 g}}.$$

The second method, referred to as "FR1.2" or "filter ratio using a 1.2 micron filter," involves passing a 200 mL sample of a polymer solution through a 47 mm diameter polycarbonate filter having 1.2 micron pores, under 1 bar pressure (+/−10%) of $N_2$ or argon at ambient temperature (e.g., 25° C.). The times required to obtain 60 g, 80 g, 100 g, and 200 g of filtrate are recorded, and the FR1.2 filter ratio is calculated as $$\frac{\text{time at 200 g} - \text{time at 180 g}}{\text{time at 80 g} - \text{time at 60 g}}.$$

Other filter ratio test methods are known and are used in this field. For example, the filter media used may have a different size (e.g., 90 mm), a different pore size, and/or a different substrate (e.g., nitrocellulose), the pressure may be different (e.g., 2 bars), the filtering intervals/amounts may be different, and other changes are envisioned. For example, U.S. Pat. No. 8,383,560 (incorporated herein by reference) describes an FR test method that compares the time taken by given volumes of a solution containing 1000 ppm of active polymer to flow through a 5 micron filter having a diameter of 47 mm at a pressure of 2 bars. In comparison, the methods described herein provide a better screening method for commercial conditions. In particular, the FR1.2 test method described herein, which uses a smaller pore size under lower pressure, provides more predictable results in commercial field testing. Polymers that provide acceptable results in the FR1.2 test method have exhibited easier processing with lower risk of formation damage.

As used herein, "inverted" means that the inverse emulsion composition is dissolved in an aqueous solution, so that the emulsified polymer phase of the emulsion composition becomes a substantially continuous phase, and the hydrophobic liquid phase becomes a dispersed, discontinuous phase. The inversion point can be characterized as the point at which the viscosity of the inverted polymer solution has substantially reached its maximum under a given set of conditions. In practice, this may be determined for example by measuring viscosity of the composition periodically over time and when three consecutive measurements are within the standard of error for the measurement, then the solution is considered inverted.

As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

As used herein, "polymer flooding" refers to an enhanced oil recovery technique using water viscosified with soluble polymers. Polymer flooding can yield a significant increase in oil recovery compared to conventional water flooding techniques. Viscosity is increased until the mobility of the injectant is less than that of the oil phase in place, so the mobility ratio is less than unity. This condition maximizes oil-recovery sweep efficiency, creating a smooth flood front without viscous fingering. Polymer flooding is also applied to heterogeneous reservoirs; the viscous injectant flows along high-permeability layers, decreasing the flow rates within them and enhancing sweep of zones with lower permeabilities. The two polymers that are used most frequently in polymer flooding are partially hydrolyzed polyacrylamide and xanthan. A typical polymer flood project involves mixing and injecting polymer over an extended period of time until at least about half of the reservoir pore volume has been injected.

Inverse Emulsion Compositions

According to the exemplary embodiments, an inverse emulsion composition comprises one or more polymers emulsified in one or more hydrophobic liquids. In exemplary embodiments, the inverse emulsion composition further comprises one or more emulsifying surfactants and one or more inverting surfactants. The inverse emulsion composition can include one or more additional components, which do not substantially diminish the desired performance or activity of the composition. It will be understood by a person having ordinary skill in the art how to appropriately formulate the inverse emulsion composition to provide necessary or desired features or properties.

In exemplary embodiments, the inverse emulsion composition further comprises water. In exemplary embodiments, the water is in the emulsified polymer phase. In exemplary embodiments, the inverse emulsion comprises greater than about 12% by weight water, based on the total amount of all components of the composition. In exemplary embodiments, the water in the inverse emulsion composition may be freshwater, saltwater, or a combination thereof. Generally, the water used may be from any source, provided that it does not contain an excess of compounds that may adversely affect other components in the composition.

In exemplary embodiments, the inverse emulsion composition includes: one or more hydrophobic liquids having a boiling point at least about 100° C.; up to about 38% by weight of one or more acrylamide-(co)polymers; one or more emulsifier surfactants; and one or more inverting surfactants.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 40° C., and a FR1.2 (1.2 micron filter) of about 1.5 or less.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 30° C., and a FR1.2 (1.2 micron filter) of about 1.5 or less.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 25° C., and a FR1.2 (1.2 micron filter) of about 1.5 or less.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 40° C., and a FR1.2 (1.2 micron filter) of about 1.1 to about 1.3.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 30° C., and a FR1.2 (1.2 micron filter) of about 1.1 to about 1.3.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 25° C., and a FR1.2 (1.2 micron filter) of about 1.1 to about 1.3.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 40° C., and a FR1.2 (1.2 micron filter) of about 1.2 or less.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 30° C., and a FR1.2 (1.2 micron filter) of about 1.2 or less.

In exemplary embodiments, when the inverse emulsion composition is inverted in an aqueous solution, providing an inverted polymer solution having about 50 to about 15,000 ppm, about 500 to about 5000 ppm, or about 500 to about 3000 ppm, active polymer concentration, the inverted polymer solution has a viscosity of at least 10 cP, or at least 20 cP, at about 25° C., and a FR1.2 (1.2 micron filter) of about 1.2 or less.

In exemplary embodiments, the inverse emulsion composition, prior to inversion, comprises up to about 38% polymer by weight, up to about 35%, or up to about 30% polymer by weight, based on the total amount of all components of the composition. In exemplary embodiments, the inverse emulsion composition, prior to inversion, comprises about 10% to about 38%, about 10% to about 35%, about 15% to about 30%, about 15% to about 38%, about 20% to about 38%, or about 20% to about 30%, polymer by weight, based on the total amount of all components of the composition.

In exemplary embodiments, the inverted polymer solution has a viscosity greater than about 10 cP, or about 20 cP, at about 25° C. In exemplary embodiments, the inverted polymer solution has a viscosity in the range of about 10 cP to about 40 cP, about 20 cP to about 40 cP, about 25 cP to about 40 cP, or about 24 cP to about 36 cP at about 25° C. In exemplary embodiments, the inverted polymer solution has a viscosity greater than about 10 cP, or about 20 cP, at about 30° C. In exemplary embodiments, the inverted polymer solution has a viscosity in the range of about 10 cP to about 30 cP, about 15 cP to about 30 cP, about 15 cP to about 25 cP, about 25 cP to about 30 cP, about 15 cP to about 22 cP, about 20 cP to about 30 cP, at about 30° C. In exemplary embodiments, the inverted polymer solution has a viscosity greater than about 10 cP, or about 15 cP, at about 40° C. In exemplary embodiments, the inverted polymer solution has a viscosity in the range of about 10 cP to about 40 cP, about 15 cP to about 35 cP, about 15 cP to about 30 cP, about 18 cP to about 30 cP, or about 20 cP to about 30 cP, at about 40° C.

In exemplary embodiments, the inverse emulsion compositions, when inverted in an aqueous solution, provide an inverted polymer solution having a FR1.2 of about 1.5 or less. Put another way, an inverted polymer solution that is derived from the inverse emulsion composition disclosed herein provides an FR1.2 of about 1.5 or less. In field testing, the exemplary inverse emulsion compositions, upon inversion, provide improved injectivity over commercially-available polymer compositions, including other polymer compositions having an FR5 (using a 5 micron filter) of about 1.5 or less. In exemplary embodiments, the inverse emulsion compositions, when inverted in an aqueous solution, provide an inverted polymer solution having a FR1.2 of about 1.0 to about 1.3, 1.0 to about 1.25, or about 1.1. to about 1.3.

In exemplary embodiments, the inverse emulsion composition, when inverted, provides an inverted polymer solution that has an FR1.2 (1.2 micron filter) of about 1.5 or less, about 1.4 or less, about 1.3 or less, about 1.2 or less, or about 1.1 or less. In exemplary embodiments, the inverse emulsion composition, when inverted, provides an inverted polymer solution that has an FR5 (5 micron filter) of about 1.5 or less, about 1.4 or less, about 1.3 or less, about 1.2 or less, or about 1.1 or less. In exemplary embodiments, an inverse emulsion composition, when inverted, provides an inverted polymer solution that has an FR1.2 of about 1.2 or less and a FR5 of about 1.2 or less.

In exemplary embodiments, the inverted polymer solution has a FR1.2 of about 1.5 or less, about 1.4 or less, about 1.3 or less, about 1.2 or less, or about 1.1 or less. In exemplary embodiments, the inverted polymer solution has an FR5 of about 1.5 or less, about 1.4 or less, about 1.3 or less, about 1.2 or less, or about 1.1 or less. In other embodiments, the inverted polymer solution has an FR5 of about 1.5 or less, and an FR1.2 of about 1.5 or less.

Below, the components of the inverse emulsion composition are discussed in greater detail.

Polymer Component

In exemplary embodiments, the inverse emulsion composition includes at least one polymer or copolymer. The at least one polymer or copolymer may be any suitable polymer or copolymer, such as a water-soluble thickening polymer or copolymer. Non-limiting examples include high molecular weight polyacrylamide, copolymers of acrylamide and further monomers, for example vinylsulfonic acid or acrylic acid. Polyacrylamide may be partly hydrolyzed polyacrylamide, in which some of the acrylamide units have been hydrolyzed to acrylic acid. In addition, it is also possible to use naturally occurring polymers, for example xanthan or polyglycosylglucan, as described, for example, by U.S. Pat. No. 6,392,596 B1 or CA 832 277.

In exemplary embodiments, the inverse emulsion composition includes one or more acrylamide (co)polymers. In exemplary embodiments, the one or more acrylamide (co) polymers is a polymer useful for enhanced oil recovery (EOR) applications. In a particular embodiment, the at least one polymer is a high molecular weight polyacrylamide or partially hydrolyzed products thereof.

In exemplary embodiments, the one or more acrylamide (co)polymers are in the form of particles, which are emulsified in the inverse emulsion composition. In exemplary embodiments, the particles of the one or more acrylamide (co)polymers have an average particle size of about 0.4 µm to about 5 µm, or about 0.5 µm to about 4 µm, or about 0.5 µm to about 2 µm. Average particle size refers to the d50 value of the particle size distribution (number average), which may be measured by the skilled artisan using known techniques for determining the particle size distribution. In exemplary embodiments, the acrylamide (co)polymers are in an aqueous phase that is emulsified in the inverse emulsion composition.

According to exemplary embodiments, the one or more acrylamide (co)polymers are selected from water-soluble acrylamide (co)polymers. In various embodiments, the acrylamide (co)polymers comprise at least 30% by weight, or at least 50% by weight acrylamide units with respect to the total amount of all monomeric units in the (co)polymer.

Optionally, the acrylamide-(co)polymers may comprise besides acrylamide at least one additional monomer. In exemplary embodiments, the acrylamide-(co)polymer may comprise less than about 50%, or less than about 40%, or less than about 30%, or less than about 20% by weight of the at least one additional monomer. In exemplary embodiments, the additional monomer is a water-soluble, ethylenically unsaturated, in particular monoethylenically unsaturated, monomer. Exemplary additional water-soluble monomers should be miscible with water in any ratio, but it is sufficient that the monomers dissolve sufficiently in an aqueous phase to copolymerize with acrylamide. In general, the solubility of such additional monomers in water at room temperature should be at least 50 g/L, preferably at least 150 g/L and more preferably at least 250 g/L.

Other exemplary water soluble monomers comprise one or more hydrophilic groups. The hydrophilic groups are in particular functional groups which comprise atoms selected from the group of O-, N-, S- or P-atoms. Examples of such functional groups comprise carbonyl groups >C=O, ether groups —O—, in particular polyethylene oxide groups —(CH$_2$—CH$_2$—O—)$_n$—, where n is preferably a number from 1 to 200, hydroxy groups —OH, ester groups —C(O) O—, primary, secondary or tertiary amino groups, ammonium groups, amide groups —C(O)—NH— or acid groups such as carboxyl groups —COOH, sulfonic acid groups —SO$_3$H, phosphonic acid groups —PO$_3$H$_2$ or phosphoric acid groups —OP(OH)$_3$.

Exemplary monoethylenically unsaturated monomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkylphosphonic acids. Of course the monomers may be used as salts.

The —COOH groups in polyacrylamide-copolymers may not only be obtained by copolymerizing acrylamide and monomers comprising —COOH groups but also by hydrolyzing derivatives of —COOH groups after polymerization. For example, amide groups —CO—NH$_2$ of acrylamide may hydrolyze thus yielding —COOH groups.

Also to be mentioned are monomers which are derivatives of acrylamide, such as, for example, N-alkyl acrylamides and N-alkyl quarternary acrylamides, where the alkyl group is C2-C28; N-methyl(meth)acrylamide, N,N'-dimethyl (meth)acrylamide, and N-methylolacrylamide; N-vinyl derivatives such as N-vinylformamide, N-vinylacetamide, N-vinylpyrrolidone or N-vinylcaprolactam; and vinyl esters, such as vinyl formate or vinyl acetate. N-vinyl derivatives can be hydrolyzed after polymerization to vinylamine units, vinyl esters to vinyl alcohol units.

Further exemplary monomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide (meth)acrylates.

Other exemplary monomers are monomers having ammonium groups, i.e., monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

Yet other exemplary monomers include monomers which may cause hydrophobic association of the (co)polymers. Such monomers comprise besides the ethylenic group and a hydrophilic part also a hydrophobic part. Such monomers are disclosed, for instance, in WO 2012/069477 A1.

In certain exemplary embodiments, each of the one or more acrylamide-(co)polymers may optionally comprise crosslinking monomers, i.e. monomers comprising more than one polymerizable group. In certain embodiments, the one or more acrylamide-(co)polymers may optionally comprise crosslinking monomers in an amount of less than about 0.5%, or about 0.1%, by weight, based on the amount of all monomers.

In an exemplary embodiment, each of the one or more acrylamide-(co)polymers comprises at least one monoethylenically unsaturated monomer comprising acid groups, for example monomers which comprise at least one group selected from —COOH, —SO$_3$H or —PO$_3$H$_2$. Examples of such monomers include but are not limited to acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. In an exemplary embodiment, the one or more acrylamide (co)polymers comprises, or wherein each of the one or more acrylamide-(co) polymers comprises, 2-acrylamido-2-methylpropanesulfonic acid or salts thereof. The amount of such monomers comprising acid groups may be from about 0.1% to about 70%, about 1% to about 50%, or about 10% to about 50% by weight based on the amount of all monomers.

In an exemplary embodiment, each of the one or more acrylamide-(co)polymers comprise from about 50% to about 90% by weight of acrylamide units and from about 10% to about 50% by weight of acrylic acid units and/or their respective salts. In an exemplary embodiment, each of the one or more acrylamide-(co)polymers comprise from about 60% to 80% by weight of acrylamide units and from 20% to 40% by weight of acrylic acid units.

In exemplary embodiments, the one or more acrylamide-(co)polymers have a weight average molecular weight ($M_w$) of greater than about 5,000,000 Dalton, or greater than about 10,000,000 Dalton, or greater than about 15,000,000 Dalton, or greater than about 20,000,000 Dalton; or greater than about 25,000,000 Dalton.

In exemplary embodiments, the solution viscosity (SV) of a solution of the inverse emulsion composition having a 0.1% active polymer in a 1.0 M NaCl aqueous solution at 25° C., is greater than about 3.0 cP, or greater than about 5 cP, or greater than about 7 cP. The SV of the inverse emulsion composition may be selected based, at least in part, on the intended active polymer concentration of the inverted polymer solution, to provide desired performance characteristics in the inverted polymer solution. For example, in exemplary embodiments, where the inverted polymer solution is intended to have an active polymer concentration of about 2000 ppm, it is desirable that the SV of a 0.1% solution of the inverse emulsion composition is in the range of about 7.0 to about 8.6, because at this level, the inverted polymer solution has desired FR1.2 and viscosity properties. An inverse emulsion composition with a lower or higher SV range may still provide desirable results, but may require changing the active polymer concentration of the inverted polymer solution to achieve desired FR1.2 and viscosity properties. For example, if the inverse emulsion composition has a lower SV range, it would be desirable to increase the active polymer concentration of the inverted polymer solution.

In exemplary embodiments, the amount of the one or more acrylamide-(co)polymers in the inverse emulsion composition is less than about 38%, or less than about 35%, or less than about 30% by weight based on the total amount of all components of the composition (before dissolution). In an exemplary embodiment, the amount of the one or more acrylamide-(co)polymers in the inverse emulsion composition is from about 10% to about 38%, or from about 10% to about 35%, or about 15% to about 30%, or about 20% to about 30% by weight based on the total amount of all components of the composition (before dissolution).

Hydrophobic Liquid

In exemplary embodiments, the inverse emulsion composition comprises a hydrophobic liquid component. Any suitable hydrophobic liquid component may be used. The hydrophobic liquid component includes at least one hydrophobic liquid.

In exemplary embodiments, the one or more hydrophobic liquids are organic hydrophobic liquids. In exemplary embodiments, the one or more hydrophobic liquids each have a boiling point at least about 100° C., about 135° C. or about 180° C. If the organic hydrophobic liquid has a boiling range, the term "boiling point" refers to the lower limit of the boiling range.

In exemplary embodiments, the one or more hydrophobic liquids are aliphatic hydrocarbons, aromatic hydrocarbons or mixtures thereof. Exemplary hydrophobic liquids include, but are not limited to, water-immiscible solvents, such as paraffin hydrocarbons, naphthene hydrocarbons, aromatic hydrocarbons, olefins, oils, stabilizing surfactants and mixtures thereof. The paraffin hydrocarbons may be saturated, linear, or branched paraffin hydrocarbons. Exemplary aromatic hydrocarbons include, but are not limited to, toluene and xylene. In exemplary embodiments, the hydrophobic liquids comprise oils, for example, vegetable oils, such as soybean oil, rapeseed oil and canola oil, and any other oil produced from the seed of any of several varieties of the rape plant.

In exemplary embodiments, the amount of the one or more hydrophobic liquids in the inverse emulsion composition is from about 20% to about 40% by weight based on the total amount of all components of the inverse emulsion composition.

Emulsifying Surfactants

In exemplary embodiments, the inverse emulsion composition optionally comprises one or more emulsifying surfactants.

In exemplary embodiments, the one or more emulsifying surfactants are capable of stabilizing water-in-oil emulsions. Emulsifying surfactants, among other things, lower the interfacial tension between the water and the water-immiscible liquid in the inverse emulsion composition, so as to facilitate the formation of a water-in-oil polymer emulsion. It is known in the art to describe the capability of surfactants to stabilize water-in-oil-emulsions or oil-in-water emulsions by using the so called "HLB-value" (hydrophilic-lipophilic balance). The HLB-value usually is a number from 0 to 20. In surfactants having a low HLB-value, the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. In exemplary embodiments, the one or more emulsifying surfactants are surfactants having an HLB-value of about 2 to about 10, or the mixture of the one or more emulsifying surfactants has an HLB-value of about 2 to about 10.

Exemplary emulsifying surfactants include, but are not limited to, sorbitan esters, in particular sorbitan monoesters with C12-C18-groups such as sorbitan monolaurate, sorbitan monopalmitate, sorbitan monostearate, sorbitan monooleate, sorbitan esters with more than one ester group such as sorbitan tristearate, sorbitan trioleate, ethoxylated fatty alcohols with 1 to 4 ethyleneoxy groups, e.g. polyoxyethylene (4) dodecylether ether, polyoxyethylene (2) hexadecyl ether, or polyoxyethylene (2) oleyl ether.

Exemplary emulsifying surfactants include, but are not limited to, emulsifiers having HLB values in the range of about 2 to about 10, preferably less than about 7. Representative, non-limiting emulsifiers include the sorbitan esters, phthalic esters, fatty acid glycerides, glycerine esters, as well as the ethoxylated versions of the above and any other well-known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier may be utilized which will permit the formation of the initial emulsion and stabilize the emulsion during the polymerization reaction. Examples of emulsifying surfactants also include modified polyester surfactants, anhydride substituted ethylene copolymers, N,N-dialkanol substituted fatty amides, and tallow amine ethoxylates.

In an exemplary embodiment, the inverse emulsion composition comprises about 0% to about 8%, about 0.05% to about 5%, about 0.1% to about 5%, or about 0.5% to about 3% by weight of the one or more emulsifying surfactants.

These emulsifying surfactants, used alone or in mixtures, are utilized in amounts of greater than about 0.5% or greater than about 1% of the total inverse emulsion composition.

Inverting Surfactants

In exemplary embodiments, the inverse emulsion composition optionally comprises one or more inverting surfactants. In exemplary embodiments, the one or more inverting surfactants are surfactants which can be used to accelerate the formation of an inverted polymer solution (e.g., a (co)polymer solution) after mixing the inverse emulsion composition with an aqueous solution.

The one or more inverting surfactants are not those which are used as emulsifying surfactants in the exemplary embodiments. Exemplary inverting surfactants include, but are not limited to, ethoxylated alcohols, alcohol ethoxylates, ethoxylated esters of sorbitan, ethoxylated esters of fatty acids, ethoxylated fatty acid esters, and ethoxylated esters of sorbitol and fatty acids, or any combination of the preceding. Exemplary inverting surfactants include nonionic surfactants comprising a hydrocarbon group and a polyalkylenoxy group of sufficient hydrophilic nature. Preferably, nonionic surfactants of the general formula $R^1$—O—(CH($R^2$)—CH$_2$—O)$_n$H (I) may be used, wherein $R^1$ is a $C_8$-$C_{22}$-hydrocarbon group, preferably an aliphatic $C_{10}$-$C_{18}$-hydrocarbon group, n is a number of ≥4, preferably ≥6, and $R^2$ is H, methyl or ethyl with the proviso that at least 50% of the groups $R^2$ are H. Examples of such surfactants include polyethoxylates based on $C_{10}$-$C_{18}$-alcohols such as $C_{12/14}$-, $C_{14/18}$- or $C_{16/18}$-fatty alcohols, $C_{13}$— or $C_{13/15}$-oxoalcohols. The HLB-value of the inverting surfactant may be adjusted by selecting the number of ethoxy groups. Specific examples include tridecylalcohol ethoxylates comprising from 4 to 14 ethylenoxy groups, e.g. tridecyalcohol·8 EO or $C_{12/14}$ fatty alcohol ethoxylates, e.g. $C_{12/14}$·8 EO. Examples of inverting surfactants also include modified polyester surfactants, anhydride substituted ethylene copolymers, N,N-dialkanol substituted fatty amides, and tallow amine ethoxylates.

Further exemplary inverting surfactants comprise include anionic surfactants, for example surfactants comprising phosphate or phosphonic acid groups.

In exemplary embodiments, the amount of the one or more inverting surfactants in the inverse emulsion composition is from about 0.5% to about 10%, or from about 1% to about 6% by weight based on the total amount of all components of the inverse emulsion composition.

In certain embodiments, the one or more inverting surfactants are added to the inverse emulsion composition directly after preparation of the composition comprising the one or more acrylamide (co)polymers emulsified in one or more hydrophobic liquids, and optionally the one or more emulsifying surfactants; i.e. the inverse emulsion composition which is transported from the location of manufacture to the location of use already comprises the one or more inverting surfactants. In another embodiment the one or more inverting surfactants may be added to the inverse emulsion composition at the location of use, e.g. at an off-shore production site.

Other Components

In exemplary embodiments, the inverse emulsion composition may optionally comprise one or more additional components, for example to provide necessary or desirable properties to the composition or to the application. Non-limiting examples of such components include radical scavengers, oxygen scavengers, chelating agents, biocides, stabilizers, or sacrificial agents.

Preparation of Inverse Emulsion Compositions

In exemplary embodiments, the inverse emulsion composition can be synthesized according to the following procedures.

An inverse emulsion (water-in-oil emulsion) of acrylamide-(co)polymers is synthesized using procedures known to the skilled artisan. Such inverse emulsions are obtained by polymerizing an aqueous solution of acrylamide and other monomers, such as water-soluble ethylenically unsaturated monomers, emulsified in a hydrophobic oil phase. Exemplary techniques are described for instance in U.S. Pat. Publication No. 2005/0239957 A1 (incorporated herein by reference).

For the polymerization, an aqueous monomer solution comprising acrylamide and optionally other monomers is prepared. Acrylamide is a solid at room temperature and aqueous solutions comprising around 50% by weight of acrylamide are commercially available. If monomers with acidic groups such as acrylic acid are used the acidic groups may be neutralized by adding aqueous bases such as aqueous sodium hydroxide. The concentration of all monomers together in the aqueous solution should usually be about 10% to about 60% by weight based on the total of all components of the monomer solution, or from about 30% to about 50%, or about 35% to about 45% by weight.

The aqueous solution of acrylamide and monomers is emulsified in the one or more hydrophobic liquids using one or more emulsifying surfactants. The one or more emulsifying surfactants may be added to the mixture or may be added to the monomer solution or the hydrophobic liquid before mixing. Emulsifying may be done in the usual manner, e.g. by stirring the mixture.

After an emulsion has been formed polymerization may be initiated by adding an initiator which results in generation of a suitable free radical. Any known free radical initiator may be employed. The initiators may be dissolved in a solvent, including but not limited to water or water miscible organic solvents, such as alcohols, and mixtures thereof. The initiators may also be added in the form of an emulsion. Exemplary initiators include, but are not limited to: azo compounds including 2,2'-azobis(2-amidinopropane) dihydrochloride, 2,2'-azobis [2-(2-imidazolin-2-yl)propane], 2,2'-azobis(isobutyronitrile) (AIBN), 2,2'-azobis(2,4-dimethylvaleronitrile) (AIVN), 2,2'-azobis(2-methylpropionamidine) dihydrochloride, and the like. Other exemplary initiators include peroxide initiators, for example benzoyl peroxide, t-butyl peroxide, t-butyl hydroperoxide and t-butyl perbenzoate. Other exemplary initiators include, for example, sodium bromate/sulfur dioxide, potassium persulfate/sodium sulfite, and ammonium persulfate/sodium sulfite, as well as initiators disclosed in U.S. Pat. No. 4,473,689.

In certain embodiments, one or more chain transfer agents may be added to the mixture during polymerization. Generally, chain transfer agents have at least one weak chemical bond, which therefore facilitates the chain transfer reaction. Any conventional chain transfer agent may be employed, such as propylene glycol, isopropanol, 2-mercaptoethanol, sodium hypophosphite, dodecyl mercaptan, thioglycolic acid, other thiols and halocarbons, such as carbon tetrachloride. The chain transfer agent is generally present in an amount of about 0.001 percent to about 10 percent by weight of the total emulsion, though more may be used.

The polymerization temperature usually is from about 30° C. to about 100° C., or about 30° C. to about 70° C., or about 35° C. to about 60° C. Heating may be done by external sources of heat and/or heat may be generated—in particular when starting polymerization—by the polymerization reaction itself. Polymerization times may for example be from about 0.5 h to about 10 h.

The polymerization yields an inverse emulsion comprising an aqueous phase of the one or more acrylamide-(co)polymers dissolved or swollen in water wherein the aqueous phase is emulsified in an organic phase comprising the one or more hydrophobic liquids.

In exemplary embodiments, the manufacture of the inverse emulsion compositions is carried out in chemical production plants.

Preparation of Inverted Polymer Solutions

According to various exemplary embodiments, a method for preparing an inverted polymer solution may include inverting and diluting an inverse emulsion composition according to the embodiments described herein, and in an aqueous solution to provide an inverted polymer solution. In exemplary embodiments, the exemplary inverse emulsion composition and an aqueous solution are mixed until the inverse emulsion composition is inverted in an aqueous solution to provide an inverted polymer solution. Various processes may be employed to prepare the inverted polymer solutions. The inverted polymer solutions are useful, for example, in methods of enhanced oil recovery, or in friction reduction applications. In exemplary embodiments, an inverted polymer solution comprises an inverse emulsion composition according to the embodiments and an aqueous solution. In exemplary embodiments, an inverted polymer solution comprises an inverse emulsion composition according to the embodiments, which has been inverted in an aqueous solution.

According to various exemplary embodiments, a method for enhanced oil recovery may include inverting and/or diluting an inverse emulsion composition according to the embodiments described herein and in an aqueous solution to provide an inverted polymer solution. In exemplary embodiments, the exemplary inverse emulsion composition and an aqueous solution are mixed until the inverse emulsion composition is inverted in the aqueous solution to provide an inverted polymer solution.

In exemplary embodiments, the aqueous solution comprises produced water, fresh water, salt water (e.g. water containing one or more salts dissolved therein), brine (e.g. produced from subterranean formations), sea water, or a combination thereof.

The term "brine" or "aqueous brine" as used herein refers to sea water; naturally-occurring brine; a chloride-based, bromide-based, formate-based, or acetate-based brine containing monovalent and/or polyvalent cations or combinations thereof. Examples of suitable chloride-based brines include, without limitation, sodium chloride and calcium chloride. Examples of suitable bromide-based brines include, without limitation, sodium bromide, calcium bromide, and zinc bromide. In addition, examples of formate-based brines include without limitation, sodium formate, potassium formate, and cesium formate.

In certain embodiments, the aqueous solution comprises about 15,000 to about 160,000; about 15,000 to about 100,000; about 15,000 to about 50,000; about 30,000 to about 40,000; or about 15,000 to about 16,000 total dissolved solids (tds). In an exemplary embodiment, the aqueous solution comprises a brine having about 15,000 tds. Generally, the water used may be from any source, provided that it does not contain an excess of compounds that may adversely affect other components in the compositions or solutions.

In exemplary embodiments, the aqueous solution has a temperature of from about 4° C. to about 45° C. In exemplary embodiments, the aqueous solution has a temperature of from about 45° C. to about 95° C.

In exemplary embodiments, the inverse emulsion composition is inverted and diluted in the aqueous solution to provide an inverted polymer solution having a active polymer concentration of acrylamide (co)polymer between about 50 and about 15,000 ppm, or about 500 and about 5000 ppm. In exemplary embodiments, the inverted polymer solution has an FR1.2 of about 1.5 or less. In exemplary embodiments, the inverted polymer solution has an FR1.2 of about 1.0 to about 1.3, or about 1.1 to about 1.3. In exemplary embodiments, the inverted polymer solution has an FR1.2 of about 1.25, or about 1.2 or less.

In some embodiments, the inverted polymer solution can have a concentration of one or more synthetic (co)polymers (e.g., one or more acrylamide (co)polymers) of at least 50 ppm (e.g., at least 100 ppm, at least 250 ppm, at least 500 ppm, at least 750 ppm, at least 1000 ppm, at least 1500 ppm, at least 2000 ppm, at least 2500 ppm, at least 3000 ppm, at least 3500 ppm, at least 4000 ppm, at least 4500 ppm, at least 5000 ppm, at least 5500 ppm, at least 6000 ppm, at least 6500 ppm, at least 7000 ppm, at least 7500 ppm, at least 8000 ppm, at least 8500 ppm, at least 9000 ppm, at least 9500 ppm, at least 10,000 ppm, at least 10,500 ppm, at least 11,000 ppm, at least 11,500 ppm, at least 12,000 ppm, at least 12,500 ppm, at least 13,000 ppm, at least 13,500 ppm, at least 14,000 ppm, or at least 14,500 ppm).

In some embodiments, the inverted polymer solution can have a concentration of one or more synthetic (co)polymers (e.g., one or more acrylamide (co)polymers) of 15,000 ppm or less (e.g., 14,500 ppm or less, 14,000 ppm or less, 13,500 ppm or less, 13,000 ppm or less, 12,500 ppm or less, 12,000 ppm or less, 11,500 ppm or less, 11,000 ppm or less, 10,500 ppm or less, 10,000 ppm or less, 9,500 ppm or less, 9,000 ppm or less, 8,500 ppm or less, 8,000 ppm or less, 7,500 ppm or less, 7,000 ppm or less, 6,500 ppm or less, 6,000 ppm or less, 5,500 ppm or less, 5,000 ppm or less, 4500 ppm or less, 4000 ppm or less, 3500 ppm or less, 3000 ppm or less, 2500 ppm or less, 2000 ppm or less, 1500 ppm or less, 1000 ppm or less, 750 ppm or less, 500 ppm or less, 250 ppm or less, or 100 ppm or less).

The inverted polymer solution can have a concentration of one or more synthetic (co)polymers (e.g., one or more acrylamide (co)polymers) ranging from any of the minimum values described above to any of the maximum values described above. For example, in some embodiments, the inverted polymer solution can have a concentration of one or more synthetic (co)polymers (e.g., one or more acrylamide (co)polymers) of from 500 to 5000 ppm (e.g., from 500 to 3000 ppm, or from 500 to 1500 ppm).

In some embodiments, the inverted polymer solution can be an aqueous unstable colloidal suspension. In other embodiments, the inverted polymer solution can be an aqueous stable solution.

In some embodiments, the inverted polymer solution can have a filter ratio of 1.5 or less (e.g., 1.45 or less, 1.4 or less, 1.35 or less, 1.3 or less, 1.25 or less, 1.2 or less, 1.15 or less, 1.1 or less, or less than 1.05) at 15 psi using a 1.2 μm filter. In some embodiments, the inverted polymer solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 µm filter.

The inverted polymer solution can a filter ratio at 15 psi using a 1.2 µm filter ranging from any of the minimum values described above to any of the maximum values described above. For example, in some embodiments, the inverted polymer solution can have a filter ratio of from 1 to 1.5 (e.g., from 1.1 to 1.4, or from 1.1 to 1.3) at 15 psi using a 1.2 µm filter.

In certain embodiments, the inverted polymer solution can have a viscosity based on shear rate, temperature, salinity, polymer concentration, and polymer molecular weight. In some embodiments, the inverted polymer solution can have a viscosity of from 2 cP to 100 cP, where the 2 cP to 100 cP is an output using the ranges in the following table:

| | |
|---|---|
| Polymer viscosity (cP) | 2~100 |
| Shear rate (1/sec) | 0.1~1000 |
| Temperature (° C.) | 1~120 |
| Salinity (ppm) | 0~250,000 |
| Polymer concentration (ppm) | 50~15,000 |
| Polymer molecular weight (Dalton) | 2M~26M |

In exemplary embodiments, the time required for the inverse emulsion composition to invert in the aqueous solution once the dissolution begins is less than 30 minutes.

The inverse emulsion composition and the inverted polymer solutions according to the embodiments may be used in a subterranean treatment. Such subterranean treatments include, but are not limited to, drilling operations, stimulation treatments, production and completion operations. Those of ordinary skill in the art, with the benefit of this disclosure, will be able to recognize a suitable subterranean treatment.

The inverse emulsion composition or an inverted polymer solution of the present embodiments may have various uses, for example in crude oil development and production from oil bearing formations that can include primary, secondary or enhanced recovery. Chemical techniques, including for example injecting surfactants (surfactant flooding) to reduce interfacial tension that prevents or inhibits oil droplets from moving through a reservoir or injecting polymers that allow the oil present to more easily mobilize through a formation, can be used before, during or after implementing primary and/or secondary recovery techniques. Such techniques can also be used for enhanced oil recovery, or to complement other enhanced oil recovery techniques.

The exemplary inverse emulsion compositions and inverted polymer solutions can be utilized in such diverse processes as flocculation aids, centrifugation aids, dewatering of mineral slurries, thin lift dewatering, emulsion breaking, sludge dewatering, raw and waste water clarification, drainage and retention aids in the manufacture of pulp and paper, flotation aids in mining processing, color removal, and agricultural applications. Generally, the exemplary inverse emulsion compositions and inverted polymer solutions described herein can be used as process aids in a variety of solid-liquid separation processes, including but not limited to, flocculation, dewatering, clarification and/or thickening processes or applications. As referred to herein, the term "dewatering" relates to the separation of water from solid material or soil by a solid-liquid separation process, such as by wet classification, centrifugation, filtration, or similar processes. In some cases, dewatering processes and apparatus are used to rigidify or improve rigidification of the dispersed particulate materials in the suspension.

The exemplary inverse emulsion compositions and inverted polymer solutions described herein can be used in a variety of dewatering, clarification and/or thickening applications. For example, the exemplary inverse emulsion compositions and inverted polymer solutions can be used in municipal and industrial waste water treatment; clarification and settling of primary and secondary industrial and municipal waste; potable water clarification; in applications in which part or all of the dewatered solids or clarified water is returned to the environment, such as sludge composting, land application of sludge, pelletization for fertilizer application, release or recycling of clarified water, papermaking; food processing applications such as waste dewatering, including waste dewatering of poultry beef, pork and potato, as well as sugar decoloring, sugar processing clarification, and sugar beet clarification; mining and mineral applications, including treatment of various mineral slurries, coal refuse dewatering and thickening, tailings thickening, and Bayer process applications such as red mud settling, red mud washing, Bayer process filtration, hydrate flocculation, and precipitation; biotechnological applications including dewatering and clarification of wastes, such as dewatering and clarification of fermentation broths; and the like.

In exemplary embodiments, the inverse emulsion composition or inverted polymer solution may be used to dewater suspended solids. In exemplary embodiments, a method of dewatering a suspension of dispersed solids comprises: (a) intermixing an effective amount of the exemplary inverse emulsion composition or inverted polymer solution, with a suspension of dispersed solids, and (b) dewatering the suspension of dispersed solids.

In exemplary embodiments, a method of dewatering an aqueous suspension of dispersed solids comprises: (a) adding an effective amount of a inverse emulsion composition or inverted polymer solution to the suspension; (b) mixing the inverse emulsion composition or inverted polymer solution into the suspension to form a treated suspension; and (c) subjecting the treated suspension to dewatering.

The exemplary inverse emulsion compositions or inverted polymer solutions may be employed in the above applications alone, in conjunction with, or serially with, other known treatments.

In exemplary embodiments, the exemplary inverse emulsion compositions or inverted polymer solutions may be used in method of deinking of paper mill process water.

In other exemplary embodiments, a method of clarifying industrial waste water comprises: adding to the waste water an effective amount of an LP composition; and clarifying the industrial waste water.

In exemplary methods the inverse emulsion compositions or inverted polymer solutions may be used as the sole treatment agent or process aid. In other embodiments, the inverse emulsion compositions or inverted polymer solutions can be used in combination with other treatment agents and process aids. In exemplary embodiments, the method further comprises adding an organic or inorganic coagulant to the waste water.

In exemplary embodiments, the exemplary inverse emulsion compositions or inverted polymer solutions may be used in method of sludge dewatering.

In exemplary embodiments, the exemplary inverse emulsion compositions or inverted polymer solutions may be used in method of clarification of oily waste water.

The exemplary inverse emulsion compositions or inverted polymer solutions can be used to treat, clarify or demulsify such waste water.

The exemplary inverse emulsion compositions or inverted polymer solutions also may be used in a method of clarifying food processing waste.

In another exemplary embodiment, the inverse emulsion composition or inverted polymer solution may be used in a process for making paper or paperboard from a cellulosic stock.

Other applications which may benefit from the exemplary inverse emulsion compositions or inverted polymer solutions include soil amendment, reforestation, erosion control, seed protection/growth, etc., in which the inverse emulsion composition or inverted polymer solution is applied to soil.

The following examples are presented for illustrative purposes only, and are not intended to be limiting.

Example 1. Preparation of an Exemplary Inverse Emulsion Composition

To a 1000 mL beaker (containing a magnetic stir bar), acrylamide (as a 53 wt % solution in water, 276.89 g of solution) was added. The solution was stirred and to this was added glacial acrylic acid (63.76 g), Diethylenetriaminepentaacetic acid (Versenex 80, 40%, 0.53 g) and water (183.31 g). Sodium hydroxide (50 wt %, 70.79 g) was added slowly maintaining the solution temperature below 30° C. until a pH of 6.0-6.5 was achieved. The pH was rechecked and adjusted to 6.0-6.5, if required.

To a 1000 mL beaker (containing a magnetic stir bar) a high boiling paraffin solvent package (211.1 g) was added. The emulsifying surfactant (12.18 g) was added and the mixture was allowed to stir until the surfactants were dissolved. The monomer solution was added to the oil phase (over a period of 30 seconds) with vigorous mixing to form the crude monomer emulsion. Once added, the mixture was allowed to stir for 20 minutes.

The crude monomer emulsion was then homogenized for 20 seconds (using a Ross ME100L homogenizer operating at 4500 rpm). The homogenized emulsion was then transferred to a 1000 mL jacketed reactor equipped with an overhead stirrer, nitrogen and sulfur dioxide gas inlets, thermocouple, vent, and controlled temperature recirculating bath. The reactor contents were then sparged 1.0 hour.

The polymerization reaction was initiated, and the reaction temperature was maintained between about 40 and about 45° C. After the exotherm had ceased, the reaction mixture was warmed to 50° C. and held for 1.5 hours. At the end of 1.5 hours, a sodium metabisulfite solution (37.5 wt %, 17.88 g) was added and allowed to mix for 10 minutes.

Example 2. Preparation of Inverted Polymer Solutions

A synthetic brine was prepared that included the following: $Na^+$, $Ca^{2+}$, $Mg^{2+}$, $Cl^-$, and TDS of about 15,000 ppm. The brine formulation was prepared and filtered through 0.45 μm filter before use.

Utilizing a 1000 mL beaker, Teflon coated mixing blade and an overhead stirrer, 360 g of brine was added to the beaker. The brine was agitated at 500 rpm and the inverse emulsion compositions prepared in Example 1 was added to the brine solution through a syringe at a dosage to result in 10,000 ppm, based on active polymer concentration. This was allowed to mix for 2 hours at a constant 500 rpm. This mother solution was diluted to 2,000 ppm utilizing 80 g of the mother solution and 320 g of additional brine. Brine was added to the beaker first which has a mixing blade stirring with an overhead mixer at 500 rpm and the mother solution was added to the shoulder of the vortex in the mixing brine. This was mixed for an additional 2 hours.

Example 3: Testing of Inverted Polymer Solutions

Samples of two inverted polymer solutions were made for evaluation. The first was made from the emulsion described in Example 1, above. The second was made from KEMFLOW A-4358 (commercially available from Kemira Chemicals, Inc.) which is a commercially available emulsion polymer, having similar charge to the exemplary emulsion. The polymers were inverted as described in Example 2, above.

Viscosities of the brine solutions were measured utilizing an Anton Paar MC302 performing a shear rate sweep from $0.1\ sec^{-1}$ to $100\ sec^{-1}$ at a controlled temperature of 40° C. utilizing a concentric circle spindle attachment. Data was recorded at $10\ sec^{-1}$ with a target viscosity of 20 cP+/−1 cP.

Filter Ratio:

Filter ratio was measured two ways. The FR5 (filter ratio using a 5 micron filter) was determined by passing 500 mL samples of inverted polymer solution prepared as described above through 5 μm 47 mm polycarbonate filter under 1 bar pressure of $N_2$ or argon. The FR5 was calculated as $$\frac{\text{time at 500 g} - \text{time at 400 g}}{\text{time at 200 g} - \text{time at 100 g}}.$$

For this example, a passing result was considered FR5≤1.2. In samples having an FR5>1.2 the product was considered not passing and further testing was not completed.

The FR1.2 (filter ratio using a 1.2 micron filter) was determined by passing 200 mL samples through 47 mm 1.2 μm polycarbonate filter under 1 bar pressure of $N_2$ or Argon. The FR1.2 was calculated as $$\frac{\text{time at 200 g} - \text{time at 180 g}}{\text{time at 80 g} - \text{time at 60 g}}$$

and reported. For this example, a passing result was considered FR1.2≤1.5, but the target for the examples was FR1.2≤1.2.

TABLE 1

| | viscosity (cP) at 40 C. | | filter ratio* | |
|---|---|---|---|---|
| | 1 sec−1 | 10 sec−1 | 5 um | 1.2 um |
| KEMFLOW A-4358 | 46.5 | 28.1 | 1.598 | n/a |
| Example 1 | 33.6 | 24.2 | 1.102 | 1.191 |

*polycarbonate membrane

As shown in the Table, only the exemplary emulsion provided acceptable filter ratio results.

Example 4

In this example, samples of exemplary AMPS-containing inverse emulsion compositions were evaluated. Samples of exemplary emulsions 4-A through 4-F were prepared as described in Example 1, where AMPS monomer was added with the acrylic acid monomer, to provide a polymer having the AMPS content (molar %) shown in Table 3, and a total charge of 30%. The polymer comprised about 70 molar % acrylamide. The resultant polymer compositions had active polymer concentrations of about 25% and were inverted as described in Example 2. Viscosity and FR1.2 values were determined for each sample using the test methods described in Example 3. The results are shown below in Table 2:

TABLE 2

| Sample | AMPS content (%) | Vis. 25°@ $10^{-s}$ (cps) | Vis. 40°@ $10^{-s}$ (cps) | FR 1.2 μm, 47 mm |
|---|---|---|---|---|
| 4-A | 5 | 35.5 | 29.2 | 1.07 |
| 4-B | 10 | 29.2 | 23.1 | 1.22 |
| 4-C | 15 | 24 | 18.8 | 1.25 |
| 4-D | 5 | 33.3 | 27.1 | 1.20 |
| 4-E | 10 | 30.2 | 23.5 | 1.20 |
| 4-F | 15 | 25.6 | 19.8 | 1.08 |

When the sample emulsion compositions were inverted and diluted to 2000 ppm active polymer concentration, the compositions that provided the desired properties were those which had a FR1.2 of about 1.2 or less.

In the preceding specification, various embodiments have been described. It will, however, be evident that various modifications and changes may be made thereto, and additional embodiments may be implemented, without departing from the broader scope of the exemplary embodiments as set forth in the claims that follow. The specification is accordingly to be regarded in an illustrative rather than restrictive sense.

What is claimed is:

1. An inverse emulsion composition comprising:
one or more hydrophobic liquids having a boiling point at least about 100° C.;
up to about 38% by weight of one or more acrylamide-(co)polymers;
water in an amount greater than about 12% by weight based on the total amount of all components of the composition;
one or more emulsifier surfactants; and
one or more inverting surfactants;
wherein, when the composition is inverted in an aqueous solution, it provides an inverted polymer solution having a filter ratio using a 1.2 micron filter (FR 1.2) at 15 psi of about 1.5 or less, and a viscosity of at least 10 cP at 40° C., for a solution comprising about 2000 ppm active polymer; and
wherein each of the one or more acrylamide-(co) polymers comprises one or more of monomers selected from the group consisting of acrylic acid, methacrylic acid, crotonic acid, itaconic acid, maleic acid, fumaric acid, monomers comprising sulfonic acid groups, vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid, 2-acrylamido-2,4,4-trimethylpentanesulfonic acid, or monomers comprising phosphonic acid groups, vinylphosphonic acid, allylphosphonic acid, N-(meth) acrylamidoalkylphosphonic acids, (meth)acryloyloxy-alkylphosphonic acids, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide(meth) acrylates, monomers which may cause hydrophobic association of the (co)polymers, N-alkyl acrylamides, N-alkyl quaternary acrylamides, salts of the foregoing, mixtures or combinations of the foregoing.

2. The composition of claim 1, wherein the aqueous solution comprises produced water, fresh water, salt water, brine, sea water, or a combination thereof.

3. The composition of claim 1, wherein when the composition is inverted in an aqueous solution to provide an inverted polymer solution comprising about 2000 ppm active polymer, the inverted polymer solution has a viscosity of at least 20 cP at 40° C.

4. The composition of claim 1, wherein when the composition is inverted in an aqueous solution, the inverted polymer solution has a FR 1.2 of about 1.0 to about 1.3.

5. The composition of claim 1, wherein when the composition is inverted in an aqueous solution, the inverted polymer solution has a FR 1.2 of about 1.2 or less.

6. The composition of claim 1 wherein when the composition is inverted in an aqueous solution, the inverted polymer solution has a filter ratio using a 5 micron filter (FR5) of about 1.5 or less.

7. The composition of claim 1, wherein the one or more hydrophobic liquids having a boiling point at least about 100° C. is selected from the group consisting of paraffin hydrocarbons, naphthene hydrocarbons, aromatic hydrocarbons, olefins, oils, stabilizing surfactants, and mixtures or combinations of the foregoing.

8. The composition of claim 1, wherein the one or more emulsifier surfactants are selected from the group consisting of sorbitan esters, ethoxylated fatty alcohols with 1 to 4 ethyleneoxy groups, phthalic esters, fatty acid glycerides, glycerine esters, sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions of the foregoing containing 1 to 10 moles of ethylene oxide per mole of the basic emulsifier, modified polyester surfactants, anhydride substituted ethylene copolymers, N,N-dialkanol substituted fatty amides, tallow amine ethoxylates, and mixtures or combinations of the foregoing.

9. The composition of claim 1, wherein the one or more inverting surfactants are selected from the group consisting of ethoxylated alcohols, alcohol ethoxylates, ethoxylated esters of sorbitan, ethoxylated esters of fatty acids, ethoxylated fatty acid esters, ethoxylatedesters of sorbitol and fatty acids, nonionic surfactants comprising a hydrocarbon group and a polyalkylenoxy group of sufficient hydrophilic nature, nonionic surfactants of the general formula $R^1$—O—(CH ($R^2$)—$CH_2$—O)$_n$H (I), wherein $R^1$ is a $C_8$-$C_{22}$-hydrocarbon group, n is a number of >4, and $R^2$ is H, methyl or ethyl, and at least 50% of the groups $R^2$ are H, polyethoxylates based on $C_{10}$-$C_{18}$-alcohols, tridecylalcohol ethoxylates comprising from 4 to 14 ethylenoxy groups, tridecylalcohol·8 EO, or $C_{12/14}$ fatty alcohol ethoxylates, $C_{12/14}$ 8 EO, modified polyester surfactants, anhydride substituted ethylene copolymers, N,N-dialkanol substituted fatty amides, tallow amine ethoxylates, and mixtures or combinations of the foregoing.

10. The composition of claim 1, wherein each of the one or more acrylamide-(co)polymers comprises at least 30% by weight of acrylamide monomer units with respect to the total amount of all monomeric units in the (co)polymer and that each of the one or more acrylamide-(co)polymers comprises at least one additional ethylenically unsaturated monomer.

11. The composition of claim 1, wherein at least one of the one or more acrylamide-(co) polymers comprises 2-acrylamido-2-methylpropanesulfonic acid or salts thereof.

12. The composition of claim 1, wherein the composition may be inverted in the aqueous solution in less than 30 minutes.

13. The composition of claim 1, wherein the one or more acrylamide-(co)polymers have a weight average molecular weight ($M_w$) of greater than about 5,000,000 Dalton.

* * * * *